United States Patent
Carr et al.

(10) Patent No.: US 7,258,302 B2
(45) Date of Patent: *Aug. 21, 2007

(54) AIRCRAFT INTERNAL WING AND DESIGN

(76) Inventors: Robert Jonathan Carr, 124 Chickasaw La., Yukon, OK (US) 73099; James Michael Higgins, 1211 NW. 16th, Oklahoma City, OK (US) 73106

(*) Notice: Subject to any disclaimer, the term of this patent is extended or adjusted under 35 U.S.C. 154(b) by 133 days.

This patent is subject to a terminal disclaimer.

(21) Appl. No.: 10/871,310

(22) Filed: Jun. 18, 2004

(65) Prior Publication Data
US 2007/0164147 A1 Jul. 19, 2007

Related U.S. Application Data

(63) Continuation-in-part of application No. 10/046,957, filed on Jan. 14, 2002, now Pat. No. 6,840,478.

(51) Int. Cl.
*B64C 39/12* (2006.01)
(52) U.S. Cl. .................... 244/45 R; 244/45 A
(58) Field of Classification Search ............ 244/45 R, 244/45 A, 130, 13, 199.4; D12/319, 331, D12/332–334
See application file for complete search history.

(56) References Cited

U.S. PATENT DOCUMENTS

| | | | |
|---|---|---|---|
| 1,299,117 A | 4/1919 | Buchanan | |
| 2,025,033 A * | 12/1935 | Atwood | 244/13 |
| D185,546 S | 6/1959 | Garaci | D34/15 |
| 2,979,287 A * | 4/1961 | Ross | 244/219 |
| 3,651,583 A | 3/1972 | Clark et al. | 35/12 B |
| 3,834,654 A | 9/1974 | Miranda | 244/13 |

(Continued)

FOREIGN PATENT DOCUMENTS

DE 3509689 A1 9/1986

(Continued)

*Primary Examiner*—Timothy D. Collins
(74) *Attorney, Agent, or Firm*—Gable Gotwals

(57) ABSTRACT

An aircraft designed with three wings located on either side of the fuselage. The forward wing has a downward angle with a curved top and bottom surface. The upper wing is located towards the rear of the aircraft and above the forward wing. The lower wing is located below the upper wing and slightly forward. It is also located to the rear and below of the forward wing. The outer ends of all three wings come into contact at one point. The forward wing uses the Coanda effect to increase the airflow across the top surface of the bottom wing. The aircraft can be designed so that it is large enough to carry people and/or cargo, or to be small enough to be flown as a toy aircraft. The like design can use any type of aircraft engine commonly used today. One embodiment of the aircraft has two turbines, shaft-coupled to a power source, located on either side of the forward end of the fuselage. Each engine has part of its thrust diverted through and directed by a plenum disposed internal of the coanda toward both sides of the fuselage so that an equal amount of thrust flows through the duct and over the wings on either side of the fuselage. This ensures equal lift on the coanda and both wings on either side of the fuselage in the event that one engine malfunctions.

13 Claims, 7 Drawing Sheets

U.S. PATENT DOCUMENTS

| | | | |
|---|---|---|---|
| 3,942,747 A | 3/1976 | Wolkovitch | 244/13 |
| 3,957,232 A * | 5/1976 | Sebrell | 244/123.11 |
| 4,053,125 A | 10/1977 | Ratony | 244/46 |
| 4,146,199 A | 3/1979 | Wenzel | 244/45 R |
| 4,365,773 A | 12/1982 | Wolkovitch | 244/45 R |
| D268,107 S | 3/1983 | Enav et al. | D12/331 |
| 4,568,042 A | 2/1986 | Carr | 244/13 |
| 4,579,300 A | 4/1986 | Carr | 244/21.1 |
| 4,856,736 A | 8/1989 | Adkins et al. | 244/45 R |
| D304,821 S | 11/1989 | Ratony | D12/331 |
| D311,720 S | 10/1990 | Butler | D12/331 |
| 5,772,156 A * | 6/1998 | Parikh et al. | 244/209 |
| 5,899,409 A | 5/1999 | Frediani | 244/13 |
| 6,015,115 A * | 1/2000 | Dorsett et al. | 244/219 |
| 6,190,484 B1 | 2/2001 | Appa | 156/189 |
| 6,347,769 B1 * | 2/2002 | To et al. | 244/219 |
| 6,474,604 B1 | 11/2002 | Carlow | 244/199 |
| 6,659,369 B1 | 12/2003 | Foster et al. | 239/333 |

FOREIGN PATENT DOCUMENTS

| | | |
|---|---|---|
| WO | WO88/05011 | 7/1988 |

\* cited by examiner

AIRCRAFT INTERNAL WING AND DESIGN

REFERENCE TO PENDING APPLICATIONS

This is a continuation-in-part patent application claiming priority of currently U.S. patent application Ser. No. 10/046,957, entitled "Aircraft Internal Wing and Design," to Robert Jonathan Carr, and having a filing date of Jan. 14, 2002 now U.S. Pat. No. 6,840,478, the specification of which is incorporated herein by reference.

TECHNICAL FIELD OF THE INVENTION

The present invention relates to a wing design for an aircraft. The wing design can be used on aircraft capable of carrying passengers and cargo as well as on model aircraft built and designed without the capability of carrying passengers or cargo to be flown for recreation. The present invention can be incorporated into a powered aircraft or glider.

BACKGROUND OF THE INVENTION

It is common knowledge that air pressure at a point on the surface of a moving object is a function of the velocity with which air streams over the surface at that point. Indeed, this principle is the basis for aircraft design; that is, it is common practice to shape the wings of an aircraft so that the velocity of air streaming over the top surface of each wing is greater than the velocity of air streaming over the bottom surface of the wing. This velocity differential, achieved by the contour of the wing, results in a pressure differential across the wing so that a net force, lift, is exerted on the wing to support the aircraft in flight.

Traditional modern day aircraft typically have a single wing located on either side of the fuselage of the aircraft. The airflow over these wings provides the lift required to raise the aircraft off of the ground. There is typically a tail located at the aft end of the fuselage with a vertical member and two horizontal members, one located on each side of the vertical member. The tail provides stability for the aircraft in flight. Also, the tail and the leading and trailing edge of the wing typically contain the control surfaces which are used to maneuver and turn the aircraft.

The present inventor has two prior patents relating to wing designs which diverge from the typical modern aircraft design. U.S. Pat. No. 4,568,042 ("the '042 patent") issued on Feb. 4, 1986 discloses an aircraft having a fuselage provided with an internal duct extending longitudinally therethrough to provide an internal wing for the craft, the internal duct having the forward end open for receiving an air stream therethrough and the aft end thereof open for discharge of the air stream therefrom, the internal contour of the duct being alterable in accordance with required operational conditions for the flight of the craft, and a plurality of control flaps and/or vanes provided at the aft end of the duct for providing operational controls for the craft in the manner of a more conventional external wing craft.

U.S. Pat. No. 4,579,300 ("the '300 patent") issued on Apr. 1, 1986 discloses how lift for an aircraft is provided by forming a longitudinal lifting duct therethrough, said lifting duct having a substantially planar roof and a longitudinally cambered floor. When the aircraft is driven forwardly, a stream of air enters and passes through the lifting duct and the contouring of the floor of the lifting duct give rise to a pressure gradient in the air stream which result in a higher pressure on the roof of the lifting duct than on the floor thereof so that the pressure difference provides lift for the aircraft.

The drawback to the aircraft design found in the '042 and '300 patents is that the aircraft had little wing span. This in turn meant that the aircraft had less desirable gliding range in the event of loss of power.

The present invention also provides a structurally much stronger wing configuration than a traditional aircraft wing design with a single wing protruding transverse to the longitudinal axis of the fuselage.

BRIEF SUMMARY OF THE INVENTION

The applicant has come up with an improved aircraft design. The aircraft has three wings and uses the Coanda effect to increase the lift available on the wings for a given speed. It also has an improved aspect ratio over the aircraft disclosed in the '042 and '300 patents and therefore provides better glide capabilities.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the design engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The present invention has a design which takes advantage of the Coanda effect. The Coanda effect causes fluids which are flowing over a curved surface to continue to follow the curvature of that surface. The Coanda effect is best demonstrated by holding a curved surface such as the side of a glass under a running stream of water. As the glass is held on its side, the water falls onto the top side of the glass and will encircle the glass as it flows over its circumference.

The present invention has three wings located on either side of the fuselage. The outer edge of all three wings are joined together. The leading wing or coanda is mounted forward of the upper and lower wing. The coanda has a downward sloping angle with a curved top and bottom surface. The upper wing is mounted higher on the fuselage and towards the rear in relation to the coanda. The lower wing is mounted below and slightly forward of the upper wing. The lower wing is also below and to the rear of the coanda. The upper surfaces of the upper wing and the lower wing are curved while the undersides of both the upper and lower wings are generally flat. This provides lift when the aircraft moves in the forward direction.

The coanda takes advantage of the Coanda effect and pulls more air over the lower wing. This increases both the density of the air flowing over the lower wing as well as the velocity across it. This in turn helps increase the lift.

The coanda helps create a split flow between the upper and lower wings creating a boundary layer separation from the bottom of the top wing and adhesion of the airflow to the wing resulting in a low pressure area just above the lower wing and a high pressure area below the upper wing. The upper and lower wings also create a venturi which also adds to the low pressure just above the lower wing. The jet-pumping action induced by the contours enhance thrust, lift and general stability. The synergistic effect of the coanda and the upper and lower wings induces a centrifugal flow component that provides additional stability for the aircraft.

The centrifugal flow component creates a pair of vortices, one under both of the upper wings. These vortices rotate in a counter-clockwise direction when looking from the end of the wings towards the fuselage of the plane. The location of the vortices varies as a function of the speed of the aircraft forward. As the speed of the aircraft increases, the vortices tend to move in an aftward direction underneath the upper wing. In alternate embodiments of the present invention, a Kruger flap can be installed on the bottom side of the upper wing just aft of the leading edge. By extending the Kruger flap or opening the Kruger flap, the location of the vortices can be moved forward.

The aircraft can be controlled by conventional control surfaces found on the coanda, the upper and lower wings, as well as the tail. In an alternative embodiment, the aircraft can be controlled by a variable camber aero hydronamic surface (VCAHS). The VCAHS is a series of collapsible and expandable honeycomb chambers located on the surface of the wings. These are coupled to a pressure manifold and a vacuum manifold. A flexible surface would then be used on top of the VCAHS to provide the outer surfaces of the coanda and upper and lower wings. The contour of the surfaces could then be altered to adjust the high and low pressure areas around the wings and provide control of the aircraft. This reduced the drag inherent with convention control surfaces.

The present invention can be used on aircraft designed to passengers and cargo as well as model or toy aircraft designed to be flown as recreation or a hobby. Such model or toy aircraft are typically launched by throwing them by hand or in the alternative by powering them with a small remote controlled motor or engine.

The present invention, when coupled with a jet propulsion system, can be capable of short takeoff and landing performance (STOL). This can be achieved by opening the saddle shunt just aft of the engines so that the thrust coming off of the engines flows across the coanda and upper and lower wing surfaces while a pair of thrust diverters located on either side of the aft end of the fuselage divert the thrust. Once airborne, the thrust diverters can be retracted so that the thrust coming across the coanda and wings of the aircraft provide a forward thrust. When the aircraft reaches the desired altitude, the saddle shunts can then be closed so that the thrust from the engines flows through the duct work located in the fuselage out the rear of the aircraft.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific object attained by its uses, reference would be had to the accompanying drawings, depictions and descriptive matter in which there is illustrated preferred embodiments and results of the invention.

DETAILED DESCRIPTION OF THE INVENTION

Figure 1:
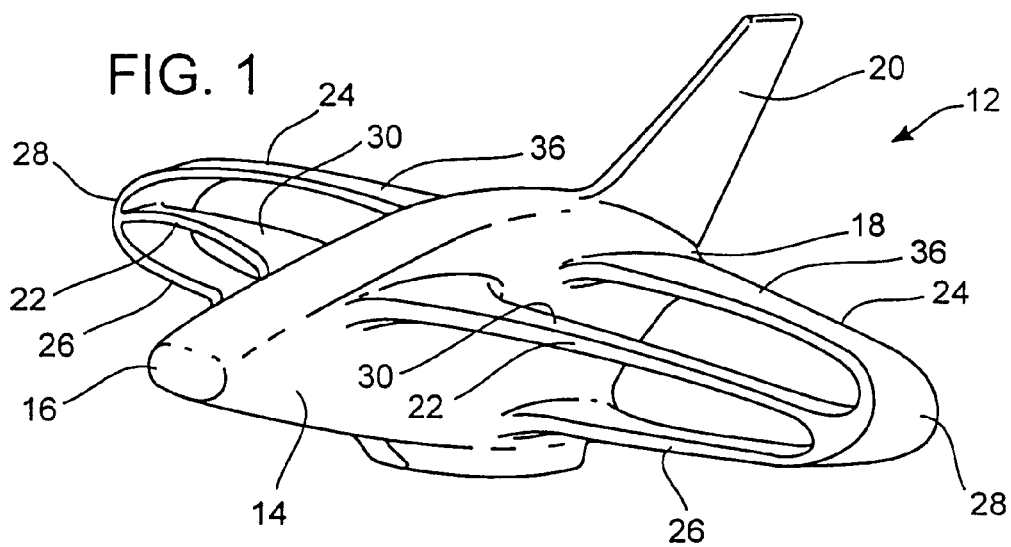
FIG. 1 is a front perspective view of an aircraft incorporating the present invention.
Figure 2:
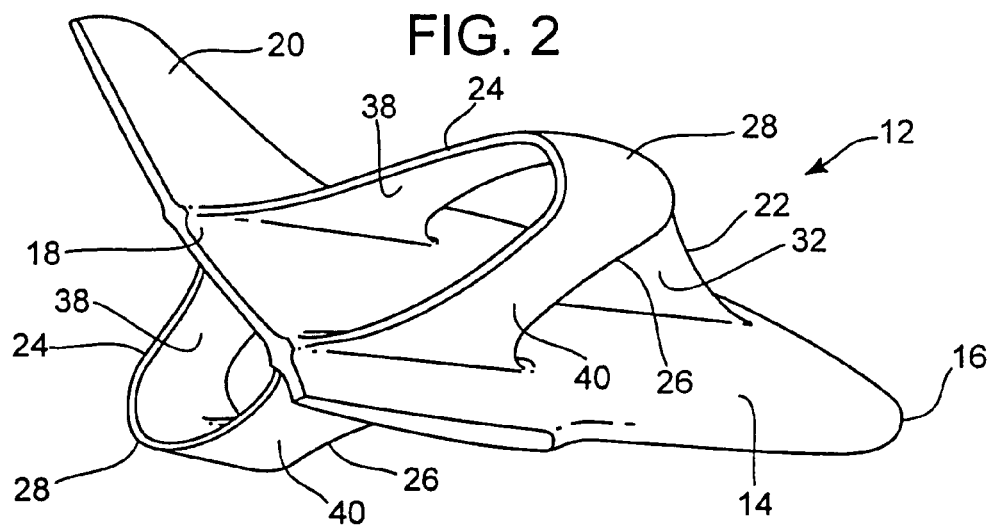
FIG. 2 is a lower rear perspective view of an aircraft incorporating the present invention.
Figure 3:
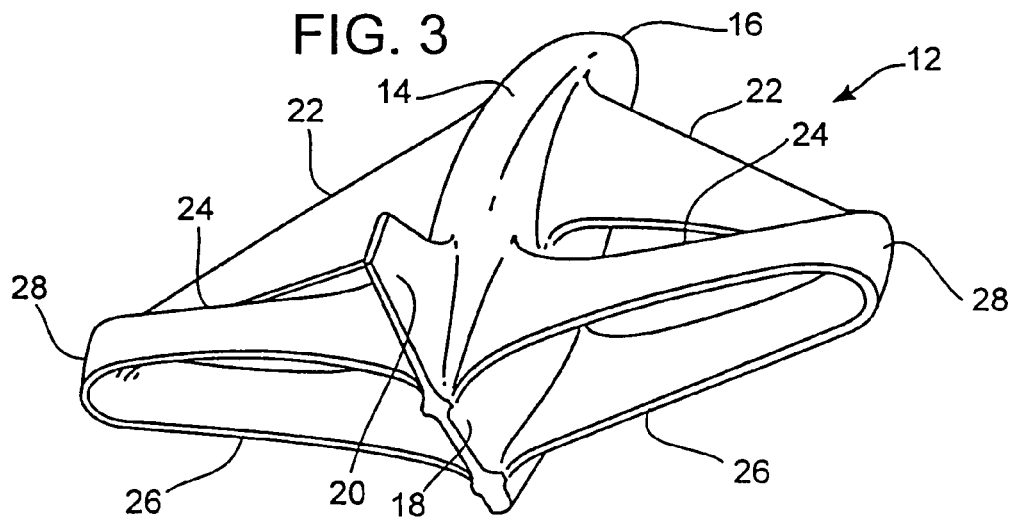
FIG. 3 is an upper rear perspective view of an aircraft incorporating the present invention.
Figure 4:
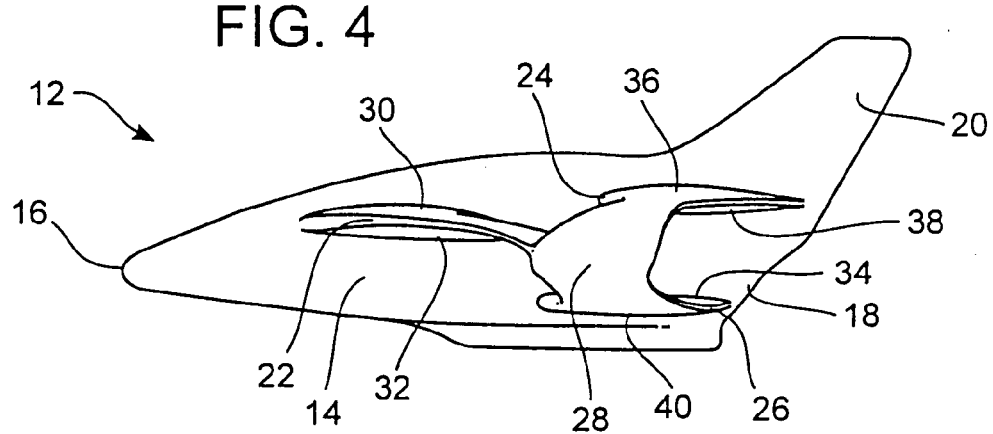
FIG. 4 is a left side view of an aircraft incorporating the present invention.
Figure 5:
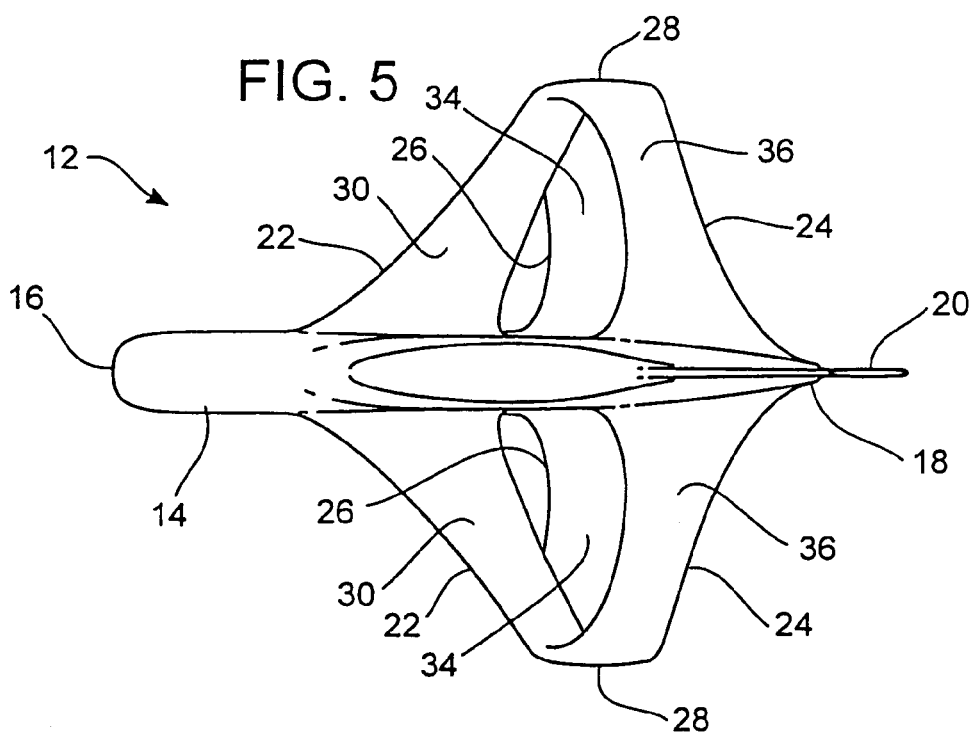
FIG. 5 is a top view of an aircraft incorporating the present invention.
Figure 6:
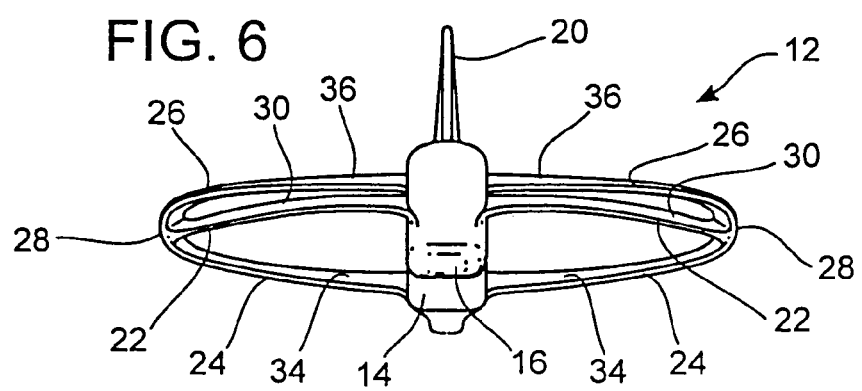
FIG. 6 is a front view of an aircraft incorporating the present invention.
Figure 7:
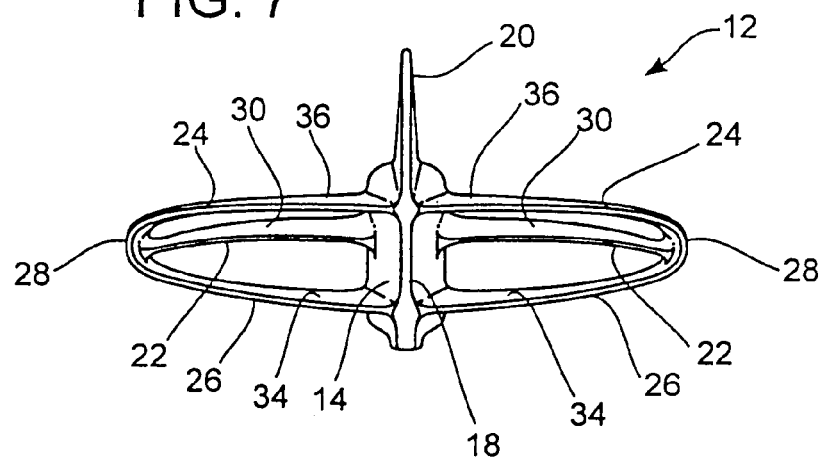
FIG. 7 is a rear view of an aircraft incorporating the present invention.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and specification describe the invention presented and the terms that are employed in the claims draw their meaning from the use of such terms in the specification.

The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

An aircraft incorporating the present invention is shown from various angles in FIGS. 1 through 7. The aircraft 12 has a fuselage 14 with a forward end 16 and an aft end 18. There is a tail 20 located on the aft end 18 of the fuselage 14. There are three wings located on either side of the fuselage 14. The forward wing or coanda 22 is located towards the forward end 16 of the fuselage 14. The upper wing 24 is located up and towards the aft end 18 of the fuselage 14 in relation to the coanda 22. The lower wing 26 is located below the upper wing 24 and slightly forward. The lower wing 26 is located below and toward the aft end 18 of the fuselage 14 in relationship to the coanda 22. The coanda 22, upper wing 24, and lower wing 26 are all connected at one point at their outer end 28.

The coanda 22 is attached to the fuselage so that it has a downward rear angle. The top and bottom surfaces 30 and 32 of the coanda 22 are curved. Due to the Coanda effect, the air flowing over and under the coanda 22 will follow the curve of the top and bottom surfaces 30 and 32 of the coanda 22 and then flow across the top surface 34 of the lower wing 26.

The top surfaces 34 and 36 of the lower and upper wings 26 and 24 are curved while the bottom surfaces 38 and 40 of the upper and lower wings 24 and 26 are generally flat. The increased airflow across the top surface 34 of the lower wing 26 due to the coanda 22 helps increase the density and velocity of the airflow across the top surface 34 of the lower wing 26. This in turn helps increase the lift generated by the lower wing 26. In addition, the upper wing 24 also generates lift.

The aircraft can be maneuvered and controlled by manipulating control surfaces found on the coanda 22, upper wing 24, lower wing 26 and tail 20. These are the types of control surfaces which are well known in the art.

Figure 8:
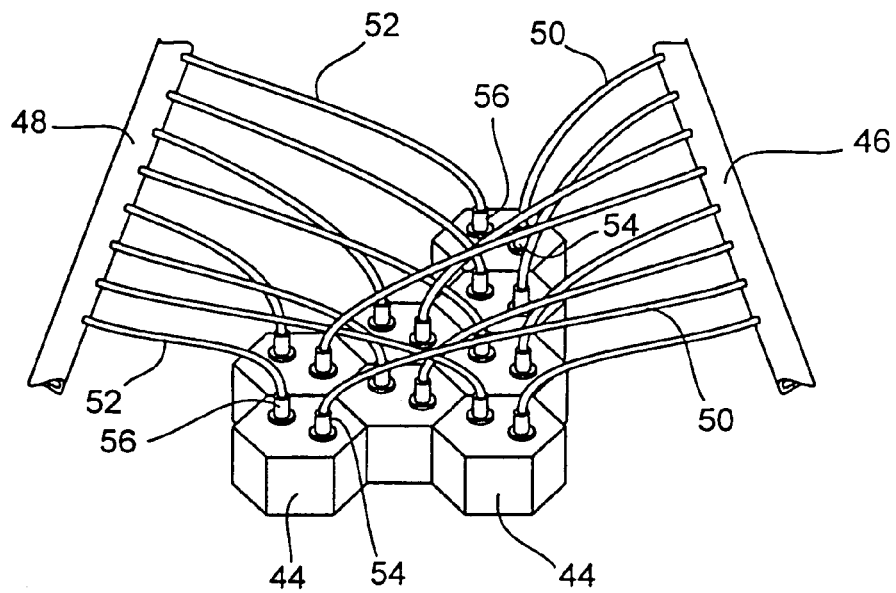
FIG. 8 is a perspective view of the variable camber aero hydrodynamic surface (VCAHS).

In an alternate embodiment, the aircraft can be maneuvered by changing the contour of the surfaces of the coanda 22, upper wing 24 and lower wing 26. FIG. 8 is a perspective view of the variable camber aero hydrodynamic surface (VCAHS) 42. The VCAHS 42 is made up of a plurality of flexible cells 44. Each cell 44 is connected to a vacuum header 46 and a pressure header 48 via a vacuum line 50 and a pressure line 52, respectively. The top and bottom surfaces 30 and 32 of the coanda 22, the top surface 34 of the lower wing 26, the top surface 36 of the upper wing 24, and the bottom surface 38 of the upper wing 24, and the bottom surface 40 of the lower win 26 can be covered with the VCAHS 42. The contour of these surfaces can then be adjusted by controlling the flow to and from the VCAHS cells 44. By adjusting the vacuum valve 54 and pressure valve 56 found on each VCAHS cell 44, the change in the contour of the surfaces can then be used to maneuver aircraft 12. This enables the aircraft 12 to be maneuvered without creating any drag inherent with conventional controlled surfaces.

Figure 9:
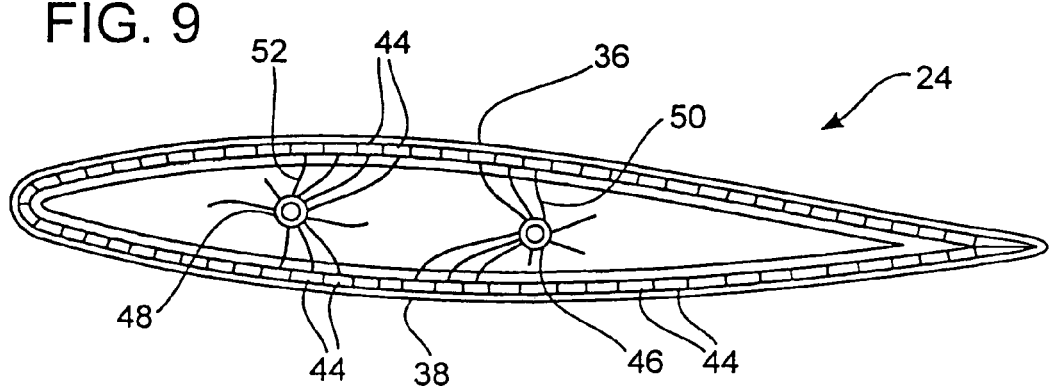
FIG. 9 is a cross-sectional view of an upper wing with a VCAHS surface.

FIG. 9 is a cross-sectional view of an upper wing 24. The top surface 36 and the bottom surface 38 of the upper wing 24 are covered with a plurality of VCAHS cells 44. Each of the VCAHS cells 44 are connected to the vacuum manifold 46 via a vacuum line 50 and the pressure manifold 48 via a pressure line 52. It should be noted that not all of the vacuum lines 50 and pressure lines 52 are shown in FIG. 9, in order to provide a more understandable drawing. The coanda 22 and the lower wing 26 can also be covered by the VCAHS 42. The contour of the upper wing 24, as well as the coanda 22 and the lower wing 26, can then be altered by changing the air pressure in the VCAHS cells 44 using the vacuum and pressure from the vacuum manifold 46 and pressure manifold 48. Not all of the vacuum lines 46 and pressure lines 48 are shown in FIG. 9, in order to provide a more legible drawing.

The present invention can be incorporated into an aircraft which is propelled by any type of power plant commonly used or known in the art. This power plant can be mounted on the forward end 16 of the fuselage 14, the tail 20, or any one or more of the wings 22, 24 and 26, as well as on the fuselage 14. The one configuration would be to mount an engine and propeller on the forward end 16 and/or the tail 20. Likewise, the present invention can be incorporated into an aircraft which is a glider. Another embodiment of the present invention is to use it on an aircraft capable of carrying passengers and/or cargo. Yet another embodiment of the present invention is to use it on a model or toy airplane or glider of the type typically flown for recreation or as a hobby.

Figure 10:
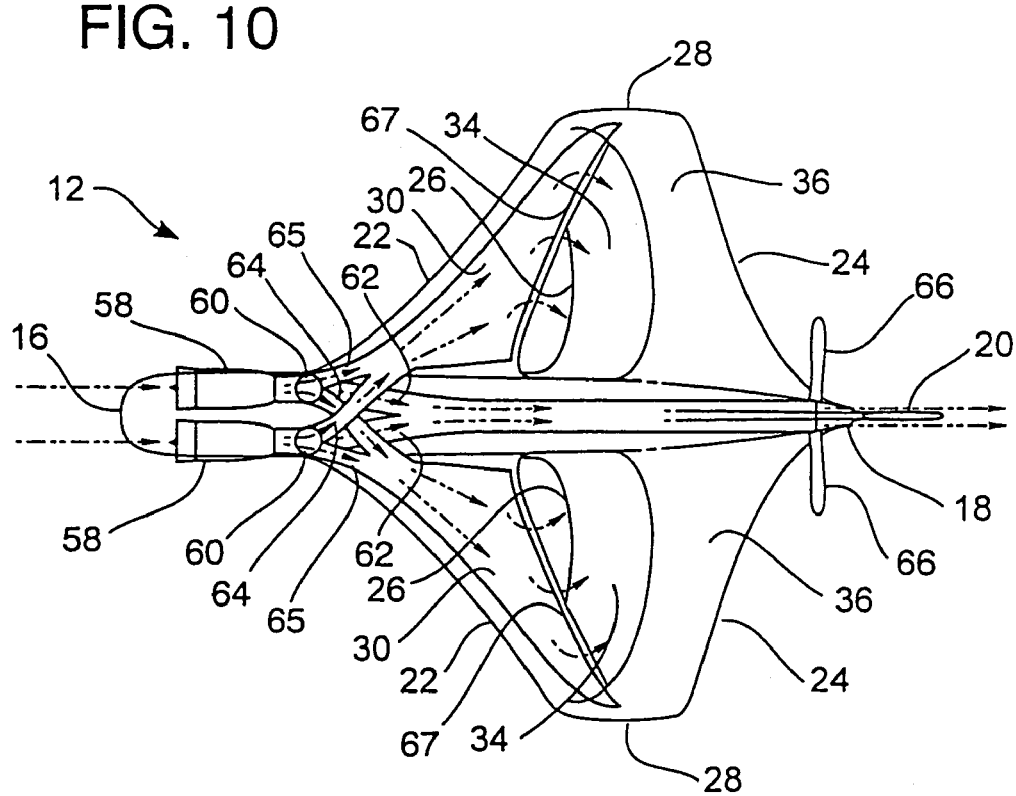
FIG. 10 is a top view showing the ducting of an aircraft incorporating the present invention along with the preferred embodiment of the power configuration.
Figure 11:
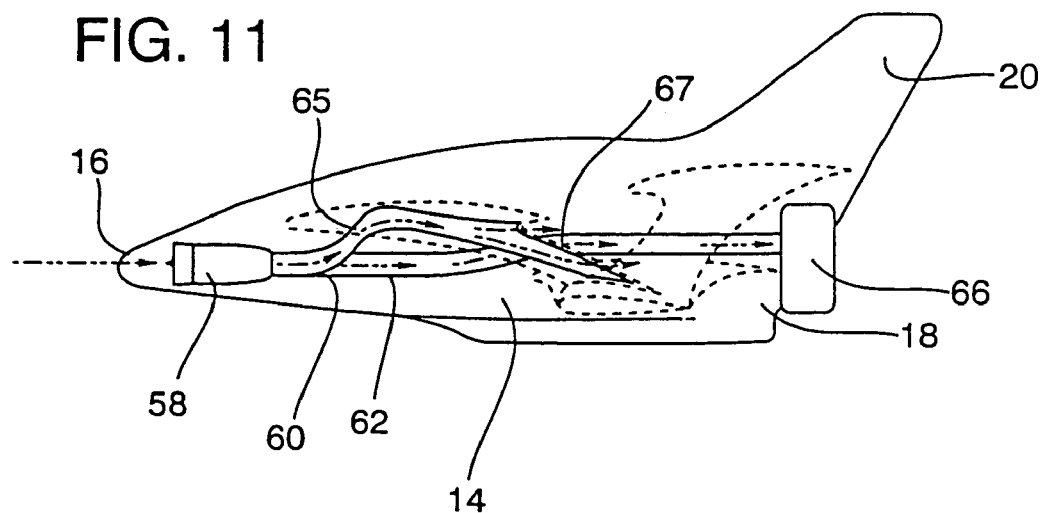
FIG. 11 is a side view showing the ducting of an aircraft incorporating the present invention along with the preferred embodiment of the power configuration.
Figure 12:
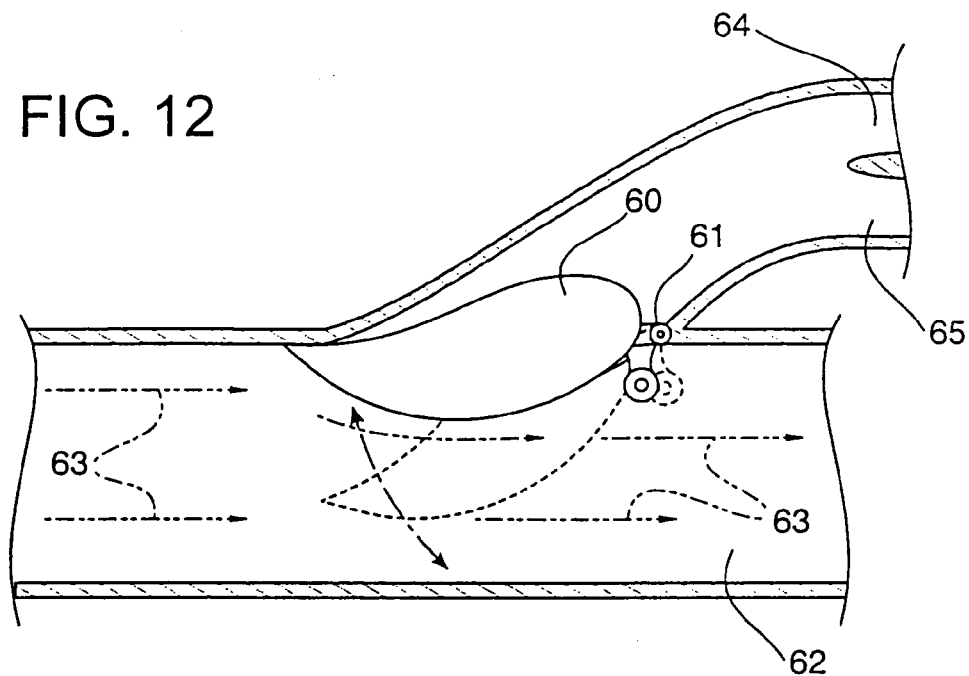
FIG. 12 is a sectional side view of the saddle shunt in the open position.
Figure 13:
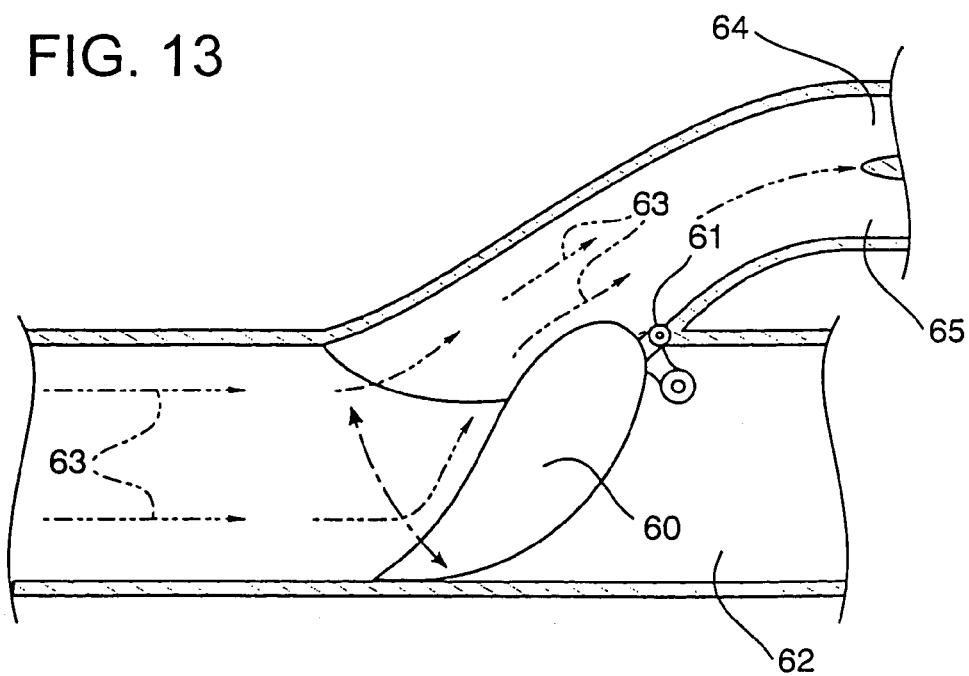
FIG. 13 is a sectional side view of the saddle shunt in the closed position.

FIG. 10 provides a top view of the preferred engine configuration. FIG. 11 provides a side view of the engine configuration found in FIG. 10. There is an engine 58 provided on either side of the fuselage 14. Each engine 58 would preferably be a turbo, however, other types of engines known in the art could be used. Each engine 58 has a saddle shunt 60 located just behind the outlet of the engine 58. The saddle shunt 60 is attached to the fuselage 14 by a hinge 61. When the saddle shunt 60 is in the open position, as shown in FIG. 12, the thrust 63 from the engines 58 flows through the through fuselage bypass duct 62 and out the aft end 18 of the aircraft 12. When the saddle shunt 60 is in the closed position, as shown in FIG. 13, the thrust 63 from the engines 58 are each diverted so that they run through the crossover duct 64 and the coanda duct 65. The thrust 63 running through the coanda duct 65 exits the coanda duct 65 through an opening 67 near the trailing edge of the coanda 22 on the same side of the fuselage 14 as the engine 58 that generated the thrust 63. The portion of the thrust 63 from each engine 58 running through the crossover ducts 64 crosses to the opposite side of the fuselage 14 from the engine 58 that generated the thrust 63. The thrust 63 from the crossover duct 64 is then injected into the coanda duct 65 where it mixes with the thrust 63 from the opposite engine 58 and exits out the opening 67 in the coanda 22 on the opposite side of the fuselage 14. This helps provide an even lift on either side of the fuselage 14 in the event that one of the engines 58 is lost or malfunctions.

The engine configuration shown in FIGS. 10 and 11 would be capable of a short takeoff or landing (STOL). In order to do that there is a pair of thrust reversers 66 located on either side of the tail 20 of the fuselage 14. FIG. 10 shows the top view of the aircraft 12 with the thrust diverters 16 in the extended position. FIG. 11 shows a side view of the aircraft 12 with the thrust diverters 66 in the retracted position. In order to perform a short takeoff or landing, the saddle shunt 60 would be in the closed position as shown in FIG. 13. This would divert the thrust from the engines 58 so that it ran through the crossover duct 64 and coanda duct 65, out the openings 67 near the trailing edge of the coandas 22 and over the top surface 34 of the lower wing 26. The thrust would then be diverted by the thrust diverters 66 located on either side of the aft end 18 of the fuselage 14. This allows the engines 58 to create the lift necessary to lift the aircraft 12 off the ground with limited forward movement. Once the aircraft 12 was at the desired altitude, the thrust diverters 66 could be retracted into the position shown in FIG. 11 to increase the forward movement of the aircraft 12.

Figure 14:
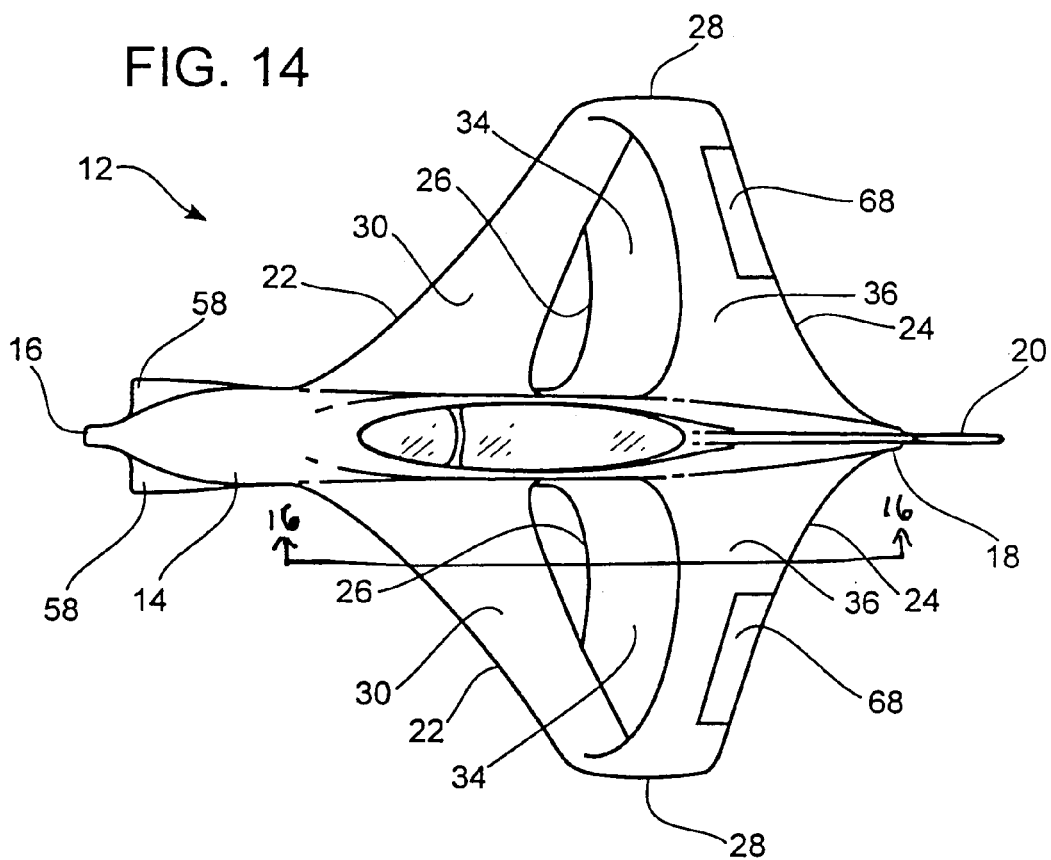
FIG. 14 is a top view of an aircraft incorporating the present invention and using conventional control surfaces.
Figure 15:
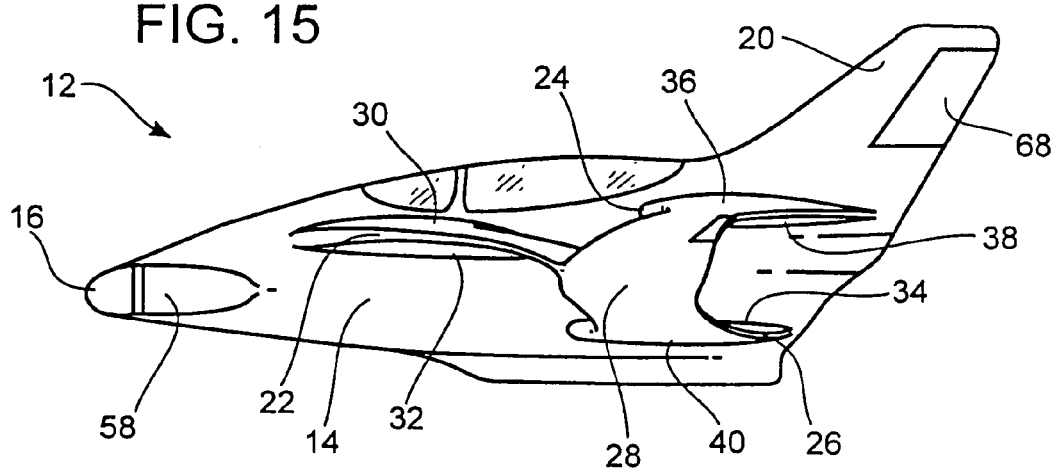
FIG. 15 is a side view of an aircraft incorporating the present invention and using conventional control surfaces.

FIG. 14 shows a top view of an aircraft 12 incorporating the present invention in use with conventional control surfaces 68 in lieu of using the VCAHS 42 control surfaces. FIG. 15 shows a side view of an aircraft incorporating the present invention and using conventional control surfaces 68. It should be noted that the location of the control surfaces 68 shown in FIGS. 14 and 15 are not the sole control surfaces that could be adapted to the aircraft 12. The present invention could include a number of other conventional control surface designs.

Figure 16:
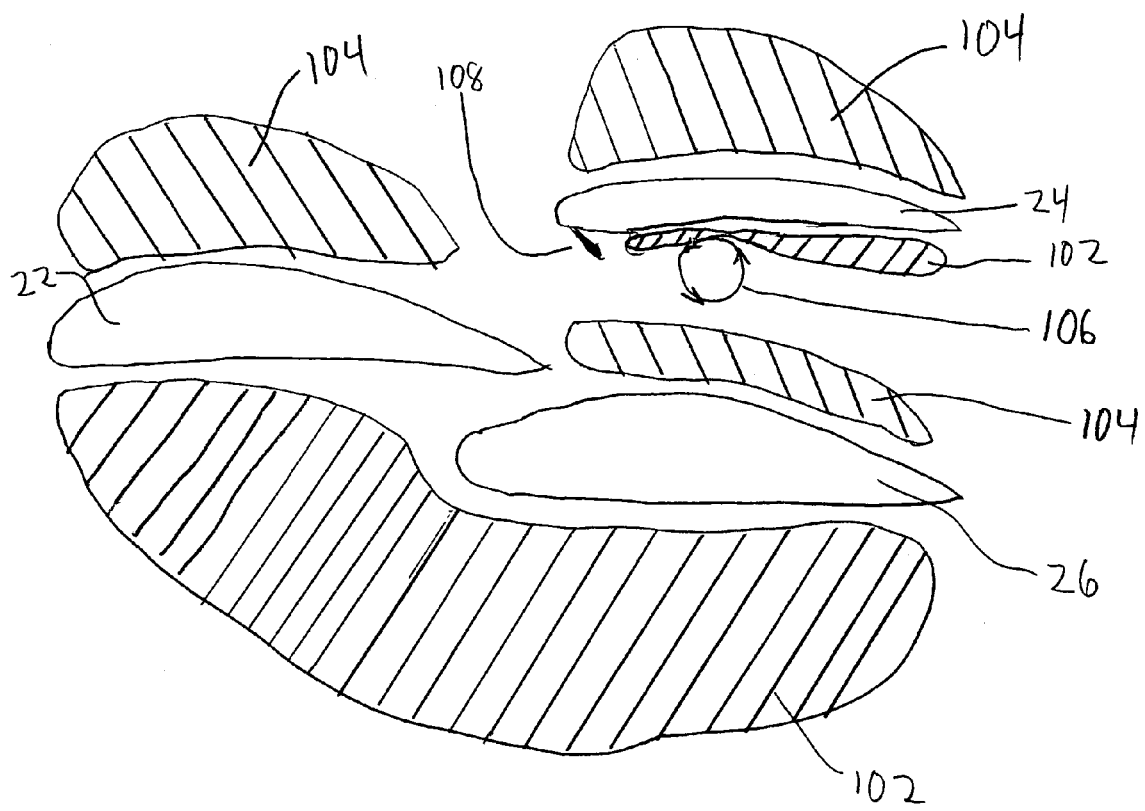
FIG. 16 is a cross-section view of the port side wings with arrows indicating the air flow.

FIG. 16 is a cross-sectional view of one embodiment of the present invention taken along a line indicated in FIG. 14. It has been simplified by not showing any of the internal structures of the coanda 22, upper wing 24 or lower wing 26. FIG. 16 shows the location of the regions of high pressure 102, the low pressure 104, and the vortex 106. As the airspeed of the aircraft 12 increases, the location of the vortex 106 migrates aftward underneath the upper wing 24. This causes change in the location of the high pressure under the wing and could affect the handling of the aircraft 12. Vortex 106 further compresses the air between the vortex 106 and the upper wing 24, thus increasing the density of the air in that region and the lift generated by the upper wing 24.

FIG. 16 also shows one embodiment of the invention, that being a Kruger flap 108 located on the bottom surface 38 of the upper wing 24 just aft of its leading edge. The Kruger flap 108 can be open or extended as shown in FIG. 16 to move the vortex 106 forward in relationship to the aircraft 12. This may be necessary to help the handling characteristics of the aircraft 12.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention, provided they come within the scope of the appended claims and their equivalents.

While this invention has been described to illustrative embodiments, this description is not to be construed in a limiting sense. Various modifications and combinations of the illustrative embodiments, as well as other embodiments, will be apparent to those skilled in the art upon referencing this disclosure. It is therefore intended that this disclosure encompass any such modification or embodiments.

What is claimed is:

1. An aircraft comprising:
   a fuselage with a forward end, an aft end and two lateral sides;
   a pair of coanda each with an inner and outer end;
   a pair of upper wings each with a leading edge, a top surface, a bottom surface, a Kruger flap, an inner end and an outer end, wherein the Kruger flap is located on the bottom surface aft of the leading edge; and
   a pair of lower wings each with an inner and outer end;
   one of the coanda is disposed on either side of the fuselage with the inner ends attached to the lateral sides of the fuselage;
   one of the upper wings is disposed on either side of the fuselage with the inner ends attached to the lateral sides of the fuselage, located aft and above in relation to the coanda;
   one of the lower wings is disposed on either side of the fuselage with the inner ends attached to the lateral sides of the fuselage, located aft and below in relation to the coanda, and below and forward in relationship to the upper wings;
   the outer ends of the coanda, upper wing and lower wing located on each lateral side meet and directly contact each other.

2. The aircraft as claimed in claim 1, wherein the coandas have a curved top surface and a curved bottom surface and a generally downward angle with relation from forward to aft of the fuselage.

3. The aircraft as claimed in claim 1, wherein the upper wings have a curved upper surface and a flat bottom surface.

4. The aircraft as claimed in claim 1, wherein the lower wings have a curved upper surface and a flat bottom surface.

5. The aircraft as claimed in claim 1, further comprising a propeller driven by an engine mounted on the forward end of the fuselage.

6. The aircraft as claimed in claim 1, further comprising a propeller driven by an engine mounted on the aft end of the fuselage.

7. The aircraft as claimed in claim 1, further comprising a pair of engines for generating thrust located on the forward end of the fuselage on either lateral side.

8. The aircraft as claimed in claim 7, further comprising a pair of saddle shunts, a pair of through-fuselage ducts, a pair of coanda ducts and a pair of crossover ducts located just aft of the engines;
   the saddle shunts are hingedly connected to the fuselage and move between an open and a closed position;
   wherein the thrust flows through the through-fuselage ducts when the saddle shunts are in the open position and through the coanda ducts and the crossover ducts when the saddle shunts are in the closed position.

9. The aircraft as claimed in claim 7, further comprising a pair of thrust diverters attached to either side of the aft end of the fuselage.

10. The aircraft as claimed in claim 1, wherein the top and bottom surfaces of the coandas and the top and bottom surfaces of the upper wings and the top and bottom surfaces of the lower wing are covered with a variable camber aero hydronamic surface comprised of a plurality of cells.

11. The aircraft as claimed in claim 10, wherein each cell has a pressure line with a pressure valve connecting the cell to a pressure manifold and a vacuum line with a vacuum valve connecting it to a vacuum manifold.

12. An aircraft comprising:
   a fuselage with a forward end, an aft end and two lateral sides;
   a pair of coanda each with a curved top surface, a curved bottom surface, an inner end, an outer end and a generally downward angle with relation from forward to aft of the fuselage;

a pair of upper wings each with a curved upper surface, a generally flat bottom surface, a leading edge, a Kruger flap an inner end and an outer end, wherein the Kruger flap is located on the bottom surface aft of the leading edge;

a pair of lower wings each with a curved upper surface, a generally flat bottom surface, an inner end and an outer end;

a propeller driven by an engine mounted on the forward end of the fuselage; and a propeller driven by an engine mounted on the aft end of the fuselage;

one of the coanda is disposed on either side of the fuselage with the inner ends attached to the lateral sides of the fuselage;

one of the upper wings is disposed on either side of the fuselage with the inner ends attached to the lateral sides of the fuselage, located aft and above in relation to the coanda;

one of the lower wings is disposed on either side of the fuselage with the inner ends attached to the lateral sides of the fuselage, located aft and below in relation to the coanda, and below and forward in relationship to the upper wings;

the outer ends of the coanda, upper wing and lower wing located on each lateral side meet and directly contact each other.

13. An aircraft comprising:

a fuselage with a forward end, an aft end and two lateral sides;

a pair of coanda each with a curved top surface, a curved bottom surface, an inner end, an outer end and a generally downward angle with relation from forward to aft of the fuselage;

a pair of upper wings each with a curved upper surface, a generally flat bottom surface, a leading edge, a Kruger flap, an inner end and an outer end, wherein the Kruger flap is located on the bottom surface aft of the leading edge;

a pair of lower wings each with a curved upper surface, a generally flat bottom surface, an inner end and an outer end;

a pair of engines for generating thrust located on the forward end of the fuselage on either lateral side;

a pair of saddle shunts, a pair of through-fuselage ducts, a pair of coanda ducts and a pair of crossover ducts located just aft of the engines, the saddle shunts are hingedly connected to the fuselage and move between an open and a closed position, wherein the trust flows through the through-fuselage ducts when the saddle shunts are in the open position and through the coanda ducts and the crossover ducts when the saddle shunts are in the closed position; and a pair of thrust diverters attached to either side of the aft end of the fuselage;

one of the coanda is disposed on either side of the fuselage with the inner ends attached to the lateral sides of the fuselage;

one of the upper wings is disposed on either side of the fuselage with the inner ends attached to the lateral sides of the fuselage, located aft and above in relation to the coanda;

one of the lower wings is disposed on either side of the fuselage with the inner ends attached to the lateral sides of the fuselage, located aft and below in relation to the coanda, and below and forward in relationship to the upper wings;

the outer ends of the coanda, upper wing and lower wing located on each lateral side meet and directly contact each other;

wherein the top and bottom surfaces of the coandas and the top and bottom surfaces of the upper wings and the top and bottom surfaces of the lower wing are covered with a variable camber aero hydronamic surface comprised of a plurality of cells, and each cell has a pressure line with a pressure valve connecting the cell to a pressure manifold and a vacuum line with a vacuum valve connecting it to a vacuum manifold.

* * * * *